(12) United States Patent
Araki

(10) Patent No.: US 8,955,207 B2
(45) Date of Patent: Feb. 17, 2015

(54) METHOD FOR DISASSEMBLING FLAT DISPLAY DEVICE

(71) Applicant: Panasonic Corporation, Osaka (JP)

(72) Inventor: Norie Araki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/784,473

(22) Filed: Mar. 4, 2013

(65) Prior Publication Data

US 2013/0185910 A1  Jul. 25, 2013

Related U.S. Application Data

(63) Continuation of application No. PCT/JP2012/002672, filed on Apr. 18, 2012.

(30) Foreign Application Priority Data

Oct. 6, 2011 (JP) .................. 2011-221605

(51) Int. Cl.
  *B23P 19/00* (2006.01)
  *B23P 19/02* (2006.01)
  (Continued)

(52) U.S. Cl.
  CPC .. *B23P 11/00* (2013.01); *B09B 3/00* (2013.01)
  USPC .......... 29/426.1; 29/426.4; 29/711; 451/326; 451/328

(58) Field of Classification Search
  CPC ............ B23P 11/00; B24C 3/14; B24C 3/18; B24C 3/26; B24B 13/00; B24B 31/062; B24B 31/02; B24B 31/03; B24B 31/14; B21J 15/12; B02C 17/18; B02C 17/22
  USPC ........ 29/426.1, 426.4, 711; 451/326, 328, 42, 451/330, 82; 241/176, 178, 179
  See application file for complete search history.

(56) References Cited

U.S. PATENT DOCUMENTS 754,122 A * 3/1904 Bucklin .................. 451/328
1,591,703 A * 7/1926 Greenfield .............. 241/178
(Continued)

FOREIGN PATENT DOCUMENTS

JP  04-327359 A  11/1992
JP  05-151898 A  6/1993
(Continued)

OTHER PUBLICATIONS

JP 11-322373 English Machine Translation; Equipment for Removing Foreign Substances on Glass Surface; Nov. 24, 1999, pp. 1-10.*

(Continued)

*Primary Examiner* — Jermie Cozart
*Assistant Examiner* — Bayan Salone
(74) *Attorney, Agent, or Firm* — McDermott Will & emery LLP

(57) ABSTRACT

The present disclosure relates to a method for disassembling a flat display device including a panel that includes a pair of glass substrates each having display materials formed on a surface thereof, the glass substrates being arranged so as to face each other. In the disassembling method, rotation body (10) which has recesses and projections (10*a*) inside thereof and rotates at a non-constant speed is used. The panel is disassembled so as to be separated into glass substrates (1*a*) and (1*b*) to thereby expose the display materials, glass substrates (1*a*) and (1*b*) each having the display materials formed on the surface thereof are then put into rotation body (10), and rotation body (10) is then rotated to perform a process for removing the display materials from the surface of each of glass substrates (1*a*) and (1*b*).

6 Claims, 3 Drawing Sheets

(51) Int. Cl.
  *B23P 21/00* (2006.01)
  *B23Q 15/00* (2006.01)
  *B24B 31/00* (2006.01)
  *B24B 31/02* (2006.01)
  *B23P 11/00* (2006.01)
  *B09B 3/00* (2006.01)

(56) References Cited

U.S. PATENT DOCUMENTS

| | | | |
|---|---|---|---|
| 1,748,039 A * | 2/1930 | Kennedy | 241/183 |
| 2,367,464 A * | 1/1945 | Henricot | 241/183 |
| 2,606,146 A * | 8/1952 | Luten, Jr. | 202/205 |
| 2,758,362 A * | 8/1956 | Benedict | 72/53 |
| 3,218,038 A * | 11/1965 | Chadbourne et al. | 366/154.1 |
| 3,518,796 A * | 7/1970 | Gawronski | 451/184 |
| 3,561,517 A * | 2/1971 | Donovan et al. | 159/6.3 |
| 3,676,096 A * | 7/1972 | Schuller et al. | 65/443 |
| 3,679,142 A * | 7/1972 | Gothard | 241/181 |
| 4,003,164 A * | 1/1977 | Carpenter et al. | 451/85 |
| 4,225,094 A * | 9/1980 | Halldorson et al. | 241/79 |
| 4,527,747 A * | 7/1985 | Scharmer et al. | 241/26 |
| 4,688,727 A * | 8/1987 | Sijsling | 241/56 |
| 4,709,507 A * | 12/1987 | Musschoot | 451/113 |
| 4,981,581 A * | 1/1991 | Didion | 209/28 |
| RE33,542 E * | 2/1991 | Musschoot | 451/113 |
| 5,109,633 A * | 5/1992 | Durnil | 451/326 |
| 5,454,749 A * | 10/1995 | Ohno | 451/329 |
| 5,471,692 A * | 12/1995 | Wasinger et al. | 8/159 |
| 5,536,203 A * | 7/1996 | Takeyoshi et al. | 451/326 |
| 5,752,665 A * | 5/1998 | Wason | 241/299 |
| 5,782,677 A * | 7/1998 | Kanouse | 451/85 |
| 5,794,865 A * | 8/1998 | Didion et al. | 241/74 |
| 6,000,640 A * | 12/1999 | Krebs et al. | 241/24.29 |
| 6,578,609 B1 * | 6/2003 | McNicol et al. | 144/208.9 |
| 7,040,209 B2 * | 5/2006 | Hoffman | 83/698.41 |
| 7,942,354 B2 * | 5/2011 | Didion | 241/74 |

FOREIGN PATENT DOCUMENTS

| | | | |
|---|---|---|---|
| JP | 11-322373 A | 11/1999 | |
| JP | 11322373 A * | 11/1999 | C03C 19/00 |
| JP | 2001-300340 A | 10/2001 | |
| JP | 2005-074293 A | 3/2005 | |
| JP | 2005074293 A * | 3/2005 | B09B 5/00 |

OTHER PUBLICATIONS

JP 2005-074293; English Machine Translation; Method for Collecting Glass Substrate for Plasma Display Panel; Mar. 24, 2005; pp. 1-22.*

International Search Report issued in International Patent Application No. PCT/JP2012/002672 dated Jun. 26, 2012.

* cited by examiner

METHOD FOR DISASSEMBLING FLAT DISPLAY DEVICE

RELATED APPLICATIONS

This application is a Continuation of International Application No. PCT/JP2012/002672, filed on Apr. 18, 2012, which in turn claims the benefit of Japanese Application No. 2011-221605, filed on Oct. 6, 2011, the disclosures of which Applications are incorporated by reference herein.

TECHNICAL FIELD

The present disclosure relates to a method for disassembling a flat display device.

BACKGROUND ART

Recently, awareness of the global environment has been improved. As a result, efforts to reuse a wide variety of components used in products have spread all over the world. In a display device such as a television receiver, recycling technologies for reusing glass have been developed up to now (refer to PTL 1).

Many of the recycling technologies that have been developed up to now are intended for a display device using a cathode-ray tube. These technologies are ones for reusing glass used in a cathode-ray tube in which the glass is separated into panel glass and funnel glass containing lead to thereby recycle the glass.

The present disclosure has been made in view of such a present situation, and an object thereof is to provide a method for disassembling a flat display device that is capable of effectively reusing resources such as glass used in a tubular display device.

CITATION LIST

Patent Literature

PTL 1: Unexamined Japanese Patent Publication No. H05-151898

SUMMARY

The present disclosure relates to a method for disassembling a flat display device including a panel that includes a pair of glass substrates each having display materials formed on a surface thereof, the glass substrates being arranged so as to face each other. A rotation body which has recesses and projections inside thereof and rotates at a non-constant speed is used. The panel is disassembled so as to be separated into glass substrates to thereby expose the display materials, the glass substrates each having the display materials formed on the surface thereof are then put into the rotation body, and the rotation body is then rotated to perform a process for removing the display materials from the surface of each of the glass substrates.

DESCRIPTION OF EMBODIMENT

Hereinafter, a method for disassembling a flat display device in an embodiment of the present disclosure will be described taking a plasma display as an example.

Figure 1:
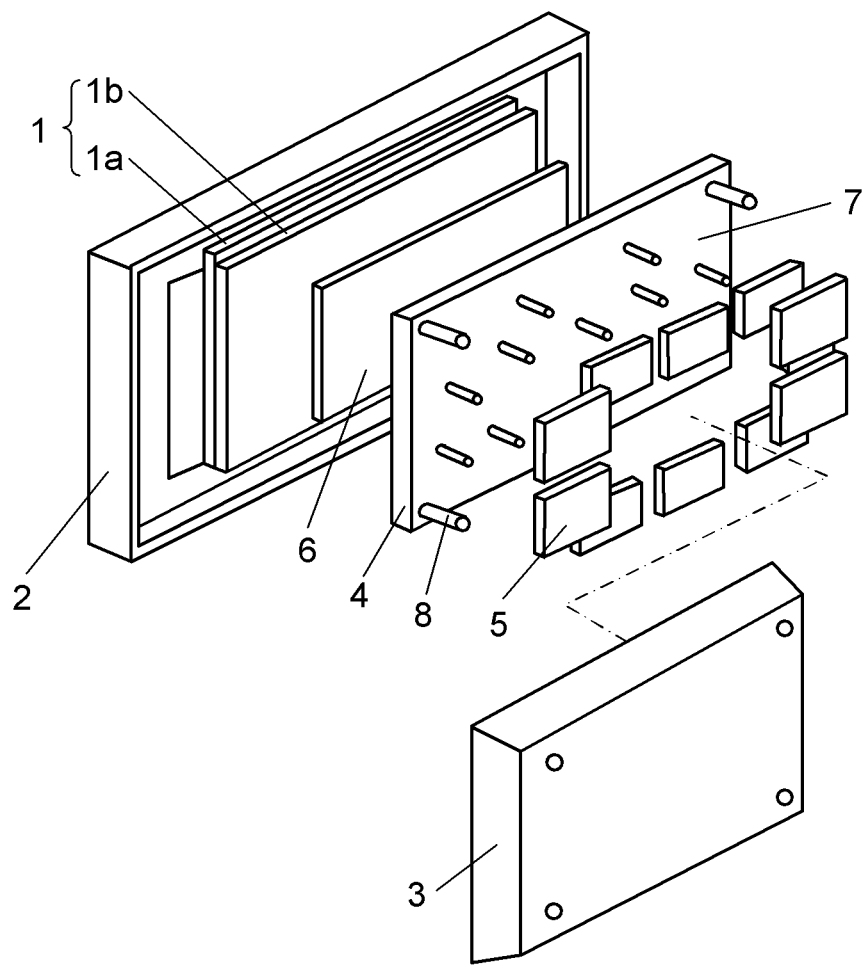
FIG. 1 is an exploded perspective view of a plasma display device in an embodiment of the present disclosure.

FIG. 1 is an exploded perspective view of a plasma display device in the embodiment of the present disclosure.

In FIG. 1, the plasma display device is provided with panel (hereinafter, referred to as PDP) 1 which includes a pair of front glass substrate 1a and rear glass substrate 1b arranged so as to face each other and a sealing material such as glass frit sealing the circumference of PDP 1, and a housing where PDP 1 is housed. The housing includes a combination of front frame 2 and back cover 3. Metal support plate 4, circuit boards 5, and adhesive member 6 are arranged between front frame 2 and back cover 3. Metal support plate 4 includes a metal plate which is made of aluminum and the like and also serves as a radiation plate. Circuit boards 5 are attached to metal support plate 4 and include drive circuits for driving PDP 1. Adhesive member 6 is an adhesive sheet having thermal conductivity and is arranged between PDP 1 and metal support plate 4 to thereby stick PDP 1 and metal support plate 4 together and also conduct heat generated by PDP 1 to metal support plate 4. Further, in metal support plate 4, attachments 8 such as securing pins are provided on attachment surface 7 which faces back cover 3. Back cover 3 and circuit boards 5 are fixed by attachments 8.

In PDP 1, there is formed, as a display material, an electrode which includes a transparent electrode containing electrically-conductive metal oxide such as indium tin oxide (ITO), stannic oxide ($SnO_2$), and zinc oxide (ZnO) and a bus electrode containing metal such as silver (Ag) on front glass substrate 1a. Further, a dielectric layer containing glass and a protective layer containing magnesium oxide (MgO) are formed so as to cover the electrode. Further, there are formed, as display materials, a data electrode containing metal such as silver (Ag), an insulating layer containing glass, barrier ribs which are configured into parallel-crosses and contain glass, and phosphor layers which are formed between the barrier ribs and each glows red, green and blue on rear glass substrate 1b.

In the disassembling method according to the embodiment of the present disclosure, the housing and circuit boards 5 are first removed, and PDP 1 is then torn off metal support plate 4 in the plasma display device shown in FIG. 1. Then, PDP 1 is disassembled so as to be separated into glass substrates 1a and 1b to thereby expose the display materials. After that, a process for removing the display materials from a surface of each of glass substrates 1a and 1b is performed.

Figure 2:
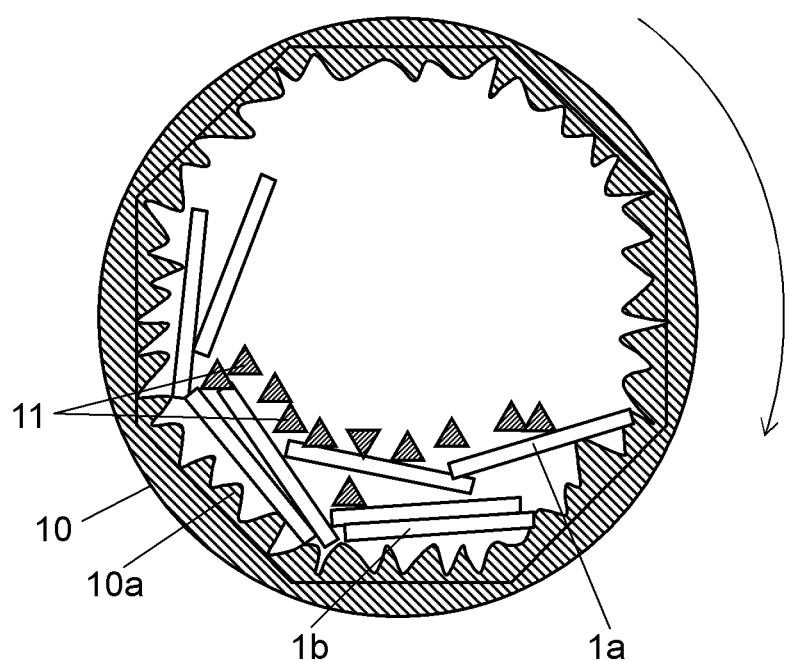
FIG. 2 is a schematic view illustrating an example of a process for removing display materials in a method for disassembling a flat display device in the embodiment of the present disclosure.

FIG. 2 is a schematic view illustrating an example of steps of the process for removing the display materials in the disassembling method according to the embodiment of the present disclosure.

As shown in FIG. 2, in the embodiment of the present disclosure, rotation body 10 having irregular recesses and projections 10a on an inner wall surface thereof is used. Glass substrates 1a and 1b on each of which the display materials are formed are put into rotation body 10. Then, rotation body 10 is rotated. At this time, rotation body 10 is rotated at a high speed and also rotated at a low speed, so that the display materials are removed from the surface of each of glass substrates 1a and 1b. In FIG. 2, reference mark 11 indicates a removal material.

Since irregular recesses and projections 10a are formed inside rotation body 10, it is possible to prevent glass substrates 1a and 1b from sticking to the wall surface. Further, friction is generated by the contact of glass substrates 1a and 1b with recesses and projections 10a, thereby making it possible to efficiently remove the display materials from the surface of each of glass substrates 1a and 1b. Further, rotation body 10 is configured to be rotated with a rotational speed thereof being switched between a high speed and a low speed. Therefore, centrifugal force acting on glass substrates 1a and 1b is changed, so that glass substrates 1a and 1b do not remain sticking to the inner wall surface of rotation body 10. Accordingly, it is possible to effectively remove the removal materials from glass substrates 1a and 1b.

Although, in the example shown in FIG. 2, both of front glass substrate 1a and rear glass substrate 1b are put into the same rotation body 10, it is more preferred that different rotation bodies 10 be used for respective glass substrates 1a and 1b to thereby perform a process for removing the display materials under the condition tailored to each of glass substrates 1a and 1b. This is because of that the display materials formed on front glass substrate 1a and the display materials formed on rear glass substrate 1b are different from each other.

Further, although, in the above example, rotation body 10 is rotated at a non-constant speed by changing the rotational speed of rotation body 10, rotation body 10 may be rotated at a non-constant speed by changing a rotational direction of rotation body 10 so as to be rotated alternately in the right and left directions.

Figure 3:
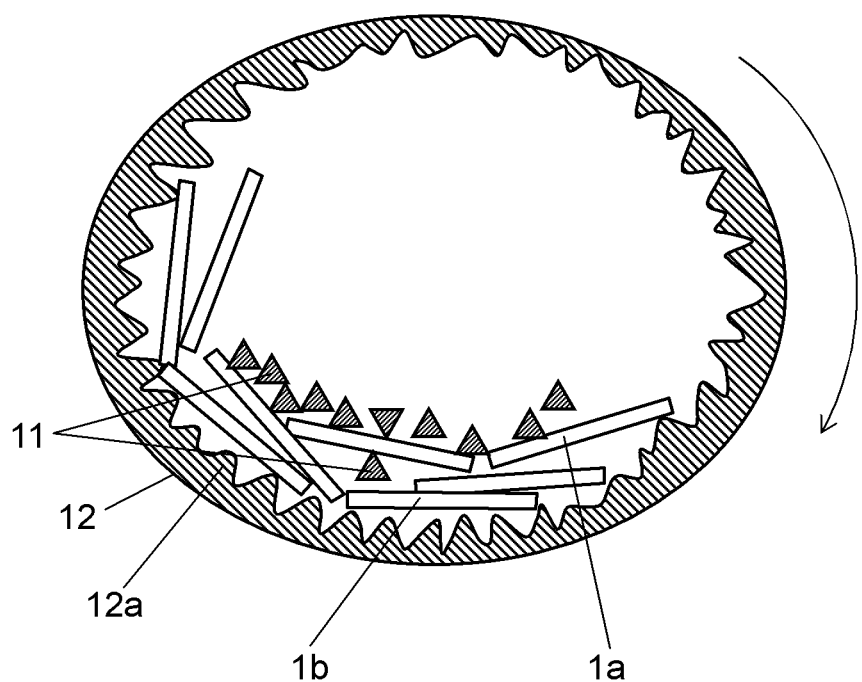
FIG. 3 is a schematic view illustrating another example of the process for removing display materials in the method for disassembling a flat display device in the embodiment of the present disclosure.

Further, as shown in FIG. 3, rotation body 12 which has irregular recesses and projections 12a on an inner wall surface thereof and has an elliptical cross-sectional shape may be used. When such rotation body 12 is rotated, rotation body 12 does not make constant speed rotational movement but make non-constant speed rotation. Although, in FIG. 3, there has been shown an example in which each of the shape of an outer surface and the shape of an inner surface of rotation body 12 is formed into an elliptical shape, rotation body 12 may be configured such that only the shape of the outer surface is formed into an elliptical shape, and the rotation of a drive unit is transmitted to the outer surface, thereby causing the non-constant speed rotation of rotation body 12.

As described above, according to the embodiment of the present disclosure, rotation bodies 10 and 12 which have irregular recesses and projections 10a and 12a and rotate at a non-constant speed are used. Further, PDP 1 is disassembled so as to be separated into glass substrates 1a and 1b to thereby expose the display materials, glass substrates 1a and 1b each having the display materials formed on the surface thereof are then put into rotation bodies 10 and 12, and rotation bodies 10 and 12 are then rotated to thereby perform a process for removing the display materials from the surface of each of glass substrates 1a and 1b. This makes it possible to prevent glass substrates 1a and 1b from sticking to the wall surface, and also efficiently remove the display materials from the surface of each of glass substrates 1a and 1b because friction is generated by the contact of glass substrates 1a and 1b with recesses and projections 10a and 12b. Further, glass substrates 1a and 1b do not remain sticking to the inner wall surface of rotation bodies 10 and 12, thereby making it possible to effectively remove the removal materials from each of glass substrates 1a and 1b.

In this manner, in a flat display device such as the plasma display device, it is possible to efficiently remove the display materials from glass substrates 1a and 1b to which the display materials are attached, and thus effectively perform recycling of glass.

INDUSTRIAL APPLICABILITY

The present disclosure is useful in effectively performing recycling of glass in a flat display device.

REFERENCE MARKS IN THE DRAWINGS 1 panel
1a, 1b glass substrate
10, 12 rotation body
10a, 12b recesses and projections
11 removal material

The invention claimed is:

1. A method for disassembling a flat display device, the flat display device including a panel including a front glass substrate and a rear glass substrate, each having display materials formed on a surface thereof, the front and rear glass substrates being arranged so as to face each other,
the method comprising:
preparing first and second rotation bodies, each of which includes recesses and projections inside thereof and rotates at a non-constant speed;
disassembling the panel so as to be separated into the front and rear glass substrates to expose the display materials;
putting the front and rear glass substrates into the first and second rotation bodies, respectively; and
rotating the first rotation body and removing the display materials from the surface of the front glass substrate, and rotating the second rotation body and removing the display materials from the surface of the rear glass substrate.

2. The method for disassembling the flat display device according to claim 1, wherein at least one of the first and second rotation bodies is configured to rotate at a non-constant speed by changing a rotational speed or a rotational direction thereof.

3. The method for disassembling the flat display device according to claim 1, wherein at least one of the first and second rotation bodies is configured to rotate at a non-constant speed by forming the rotation body to have an elliptical cross-sectional shape.

4. The method for disassembling the flat display device according to claim 1,
wherein the recesses and projections are irregularly formed inside at least one of the first and second rotation bodies.

5. The method for disassembling the flat display device according to claim 1,
wherein the recesses and projections are formed inside at least one of the first and second rotation bodies toward a rotation direction of the at least one of the first and second rotation bodies.

6. The method for disassembling the flat display device according to claim 1, wherein a condition in rotating the first rotation body and removing the display materials from the surface of the front glass substrate is different from a condition in rotating the second rotation body and removing the display materials from the surface of the rear glass substrate.

* * * * *